US009354138B2

(12) United States Patent
Murphy et al.

(10) Patent No.: US 9,354,138 B2
(45) Date of Patent: May 31, 2016

(54) FIXTURE FOR TEST CIRCUIT BOARD RELIABILITY TESTING

(71) Applicant: Texas Instruments Incorporated, Dallas, TX (US)

(72) Inventors: Anthony B. Murphy, Dallas, TX (US); Guangneng Zhang, Plano, TX (US); Masood Murtuza, Stafford, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 351 days.

(21) Appl. No.: 13/933,882

(22) Filed: Jul. 2, 2013

(65) Prior Publication Data

US 2015/0007662 A1    Jan. 8, 2015

(51) Int. Cl.
*G01M 7/02* (2006.01)

(52) U.S. Cl.
CPC ..................... *G01M 7/027* (2013.01)

(58) Field of Classification Search
CPC .................................................. G01M 7/027
USPC .......................................................... 73/663
See application file for complete search history.

(56) References Cited

U.S. PATENT DOCUMENTS

| 5,424,918 | A  | * | 6/1995  | Felps et al. ..................... 361/704 |
| 6,251,219 | B1 | * | 6/2001  | Chen et al. ..................... 156/556 |
| 6,678,627 | B1 |   | 1/2004  | Starr |
| 7,768,785 | B2 | * | 8/2010  | Ni et al. ........................ 361/715 |
| 7,999,374 | B2 | * | 8/2011  | So et al. ........................ 257/712 |
| 8,602,092 | B2 | * | 12/2013 | Lenehan et al. ............... 165/247 |

FOREIGN PATENT DOCUMENTS

| CN | 103954798 | * | 7/2014 |
| WO | WO2007140432 | * | 12/2007 |

* cited by examiner

*Primary Examiner* — J M Saint Surin
(74) *Attorney, Agent, or Firm* — Steven A. Shaw; Frank D. Cimino (57) ABSTRACT

A fixture for securing at least one test printed circuit board assembly (PCBA) including a PCB having semiconductor devices mounted thereon during vibration or mechanical shock testing. A top plate includes top features including a continuous top outer ring, at least one inner top aperture within the top outer ring, and a plurality of outer top apertures positioned beyond the top outer ring including a top probe access aperture and a threaded aperture. A bottom plate includes bottom features including a bottom continuous outer ring, at least one inner bottom aperture, and plurality of outer bottom apertures including a bottom probe access aperture and table mounting aperture. The threaded apertures accept a fastener that clamps the top plate to the bottom plate for the outer rings to secure a full periphery of the PCB between the top plate and bottom plate.

12 Claims, 6 Drawing Sheets

FIG. 4B

FIXTURE FOR TEST CIRCUIT BOARD RELIABILITY TESTING

FIELD

Disclosed embodiments relate to fixtures and systems for reliability testing of test printed circuit board assemblies having semiconductor devices mounted thereto including vibration and/or mechanical shock testing, and optionally also temperature cycling.

BACKGROUND

A printed circuit board (PCB) having copper tracks and features when populated with components including capacitors, resistors or active devices (e.g., semiconductor devices including packaged semiconductor devices) electrically interconnected on the board may be referred to as a PCB Assembly (PCBA), or printed circuit assembly (PCA). In a through-hole construction, component leads are inserted in apertures/holes in the board. In a surface-mount construction, the components are placed on pads or lands on the outer surfaces of the PCB. In both of these constructions, component leads are conventionally electrically and mechanically affixed to the PCB with metal solder.

For certain applications (e.g., automotive applications) it is desirable to perform vibration/shock testing of specially prepared test PCBAs to provide board level reliability (BLR) testing which stresses the solder joints between the semiconductor devices and the PCB to obtain reliability data for the solder joints. For a typical test PCBA, there are a plurality of the same packaged semiconductor devices (e.g., ball grid array (BGA) devices, leadframe or quad-flat no-leads (QFN) package) spread over the area of the PCB. The test PCBAs are for BLR testing only and are not configured for use in an end product. Solder joints are generally the weakest link in the interconnection. BLR testing aims to assess solder joint fatigue life or strength. Component level failure mechanisms (e.g. die cracking) can also generally be identified in BLR.

Each semiconductor device and the PCB include metal pads thereon to implement a daisy chain resistor with the solder joints therebetween which provide the electrical coupling between the metal pads on the PCB and metal pads on the semiconductor devices. During testing the test PCBA is mounted into a test fixture that holds the rectangular PCB typically only by its 4 corner/edge positions to provide 4-point support as the test PCBA is vibrated or mechanically shocked to provide mechanical stresses to the solder joints. The daisy chains including solder joints between each of the semiconductor devices on the test PCBA and the PCB are individually monitored electrically (by having their resistance measured) by electrical monitoring equipment to obtain reliability data under the stressed condition(s) for the joints.

Within the last 2 decades, automobile manufacturers have started incorporating electronics in almost every function within the vehicle which has resulted in an increased physical robustness requirement for semiconductor devices. Due to the need to reduce human exposure to hazardous substances (i.e. lead (Pb)), the metal solder used by semiconductor manufacturers for the component leads to be electrically and mechanically fixed to the PCB have reduced the ability to withstand extreme temperature and physical stress such as vibration or mechanical shock.

The National Aeronautics and Space Administration (NASA) performed a vibration experiment in 2007 which confirmed that Pb BGA semiconductor products satisfied their extreme physical requirements, but Pb-free BGA products performed significantly worse when subjected to the same vibration profile. While the semiconductor industry has been responsive to providing automobile manufacturers with increasingly functional devices, there has been little to no updating of the reliability methodologies enlisted to evaluate the physical reliability performance of semiconductor devices on PCBAs.

SUMMARY

Disclose embodiments include fixtures for securing at least one test printed circuit board assembly (PCBA) including a printed circuit board (PCB) having a plurality of semiconductor devices (e.g., packaged semiconductor devices) mounted thereon during vibration and/or mechanical shock testing, and optionally temperature cycling as well. The fixtures include a top plate having a plurality of top features including apertures and a bottom plate including a plurality of bottom features including apertures, where the top and bottom plates having test PBCA(s) therebetween are clamped together by suitable fasteners across apertures provided, and a portion of the fixture is mounted to the vibration or mechanical shock table for test which restricts movement of the board(s).

Disclosed fixtures allow temperature cycling plus vibration and/or mechanical shock reliability testing while emulating the application by the fixture providing at least one inner aperture making physical contact along the full periphery of the PCB(s). Emulating the application refers to the apertures being sized accordingly to the size of the product application board (end product) since the vibration test stress is recognized herein to scale up with board size. The top outer ring and inner top aperture can match the bottom outer ring and inner bottom aperture in both size and position to one another.

Disclosed embodiments include a fixture for securing at least one test PCBA including a PCB having semiconductor devices mounted thereon during vibratory testing. A top plate includes top features including a continuous top outer ring, at least one inner top aperture within the top outer ring, and a plurality of outer top apertures positioned beyond the top outer ring including a top probe access aperture and a threaded aperture. A bottom plate includes bottom features including a bottom continuous outer ring, at least one inner bottom aperture, and plurality of outer bottom apertures including a bottom probe access aperture and table mounting aperture. The threaded apertures accept a fastener (e.g. a screw) that clamps the top plate to the bottom plate for the outer rings to secure a full periphery of the PCB between the top plate and bottom plate.

BRIEF DESCRIPTION OF THE DRAWINGS

Reference will now be made to the accompanying drawings, which are not necessarily drawn to scale, wherein.

DETAILED DESCRIPTION

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Figure 1A:
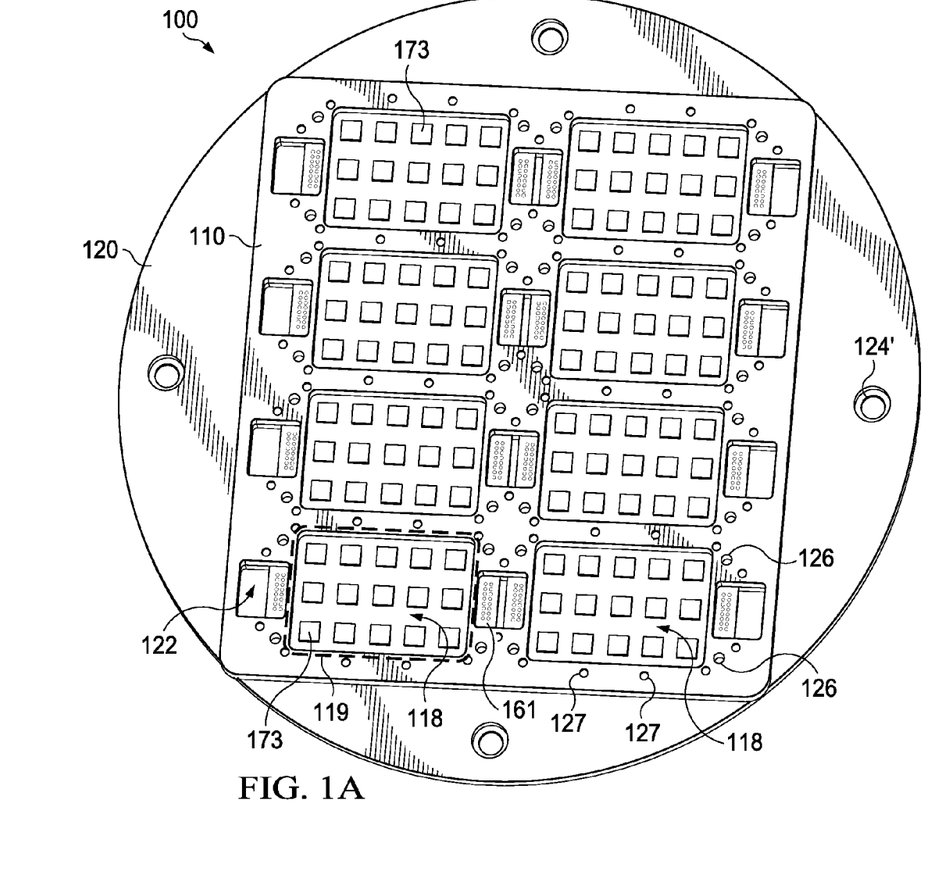
FIG. 1A is a depiction of a first example fixture with eight (8) PCBAs being held between a top plate and a bottom plate, according to an example embodiment.

FIG. 1A is a depiction of a first example fixture 100 with eight (8) test PCBAs being held between a top plate 110 and a bottom plate 120, according to an example embodiment. The top plate 110 and bottom plate 120 generally both comprise aluminum, but can generally comprise any metal. The top plate 110 includes top features including a continuous top outer ring 119, at least one inner top aperture 118 shown as eight (8) inner top apertures all within respective top outer rings, and a plurality of outer top apertures positioned beyond the top outer ring including a top probe access aperture 122. Probe access aperture 122 allows hand soldering of test wires from electrical monitoring equipment (an event detector or data logger) to the connection holes shown in the PCB of PCBA 161 that has semiconductor devices 173 thereon (identified as 311, 312 in FIG. 3 described below), and desoldering after test.

Apertures 126 are also shown for avoiding contact with ground (GND) pads on the boards. Each PCB, per the Electron Devices Engineering Council (JEDEC) standard has exposed GND pads corresponding to locations of apertures 126. Disclosed fixtures recognize if the fixture 100 makes electrical contact with these GND pads, significant noise or leakage may be introduced into the resistance monitoring. Therefore apertures 126 are provided to avoid this undesirable contact. Threaded through holes 127 together with a suitable fastener (e.g., screws) are for securing the respective plates 110, 120 to one another and to provide the alignment for the top outer ring and inner top aperture and bottom outer ring and inner bottom aperture.

The edge of the inner apertures 118 sets the boundary of the vibration of the PCB. Within the area of the inner apertures 118, the vibration is stronger (in terms of amplitude). Beyond the area of the inner apertures 118 i.e., in the clamped area, the vibration of the PCB is same as the vibration table (theoretically) that provides the vibration for vibration testing.

Figure 1B:
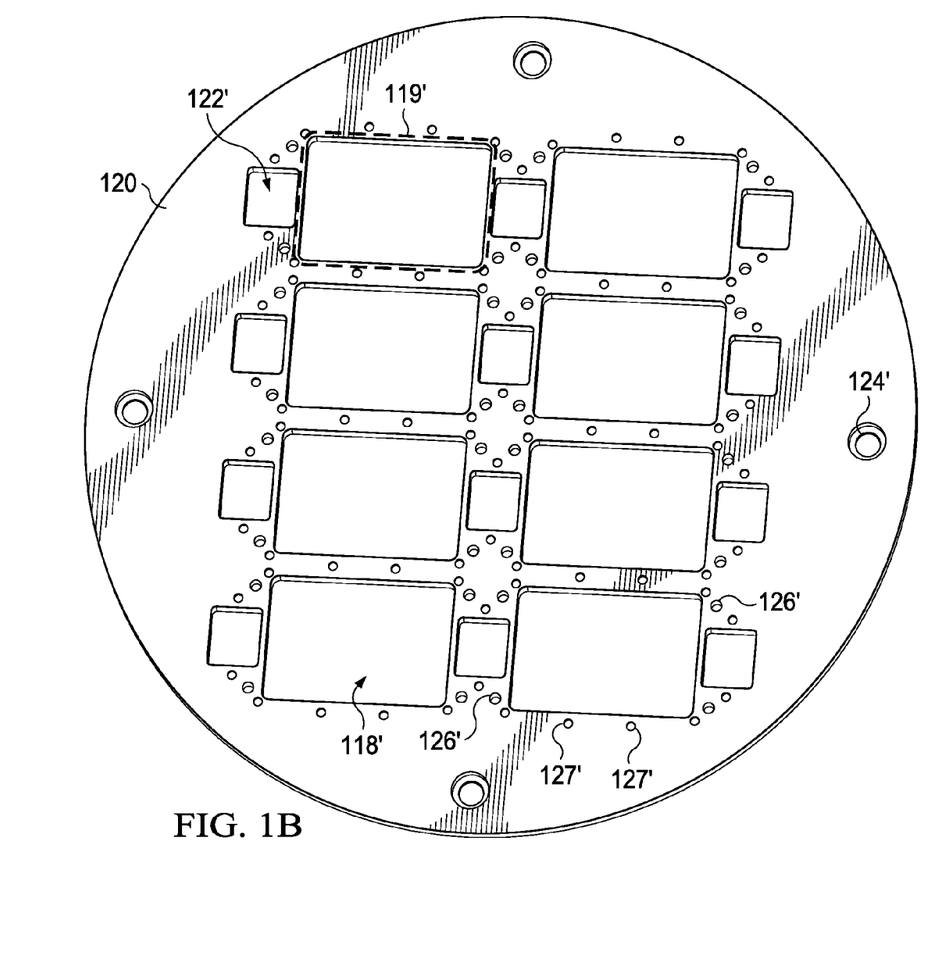
FIG. 1B is a depiction of the bottom plate shown in FIG. 1A that evidences the bottom features substantially matching the top features shown in FIG. 1A in both size and position upon alignment to one another.

FIG. 1B is a depiction of the bottom plate 120 shown in FIG. 1A. As shown in FIG. 1B, the bottom plate 120 includes bottom features including a bottom outer ring 119', at least one inner bottom aperture 118' shown as eight (8) inner bottom apertures 118' each within respective bottom outer rings 119', and a plurality of outer bottom apertures positioned beyond the bottom outer ring including a bottom probe access aperture 122' and a table mounting aperture 124'. Apertures 126' are also shown for avoiding contact with board GND pads. Threaded through holes 127' are also shown. The top outer ring 119 and inner top aperture 118 in FIG. 1A can be seen to match the bottom outer ring 119' and inner bottom aperture 118' in FIG. 1B in both size and position upon alignment to one another. The table mounting apertures 124' are for accepting a fastener (e.g., a screw) that secures the fixture 100 to a vibration table.

The top outer ring 119 and inner top aperture 118 matching the bottom outer ring 119' and inner bottom aperture 118' in both size and position is recognized herein to provide advantages including: 1) simplifying the vibration movement 2) simplifying the reliability modeling by providing a plurality of semiconductor devices with the same symmetry and thus essentially the same vibrational stress condition, and 3) to simulate a real application in an automotive application (or similar application) where the PCBs are clamped in such way. Data provided by a test apparatus including disclosed fixtures provide statistically viable information which can be used to provide the customer with suggested parameters for their own in-house testing or assembly.

Figure 1C:
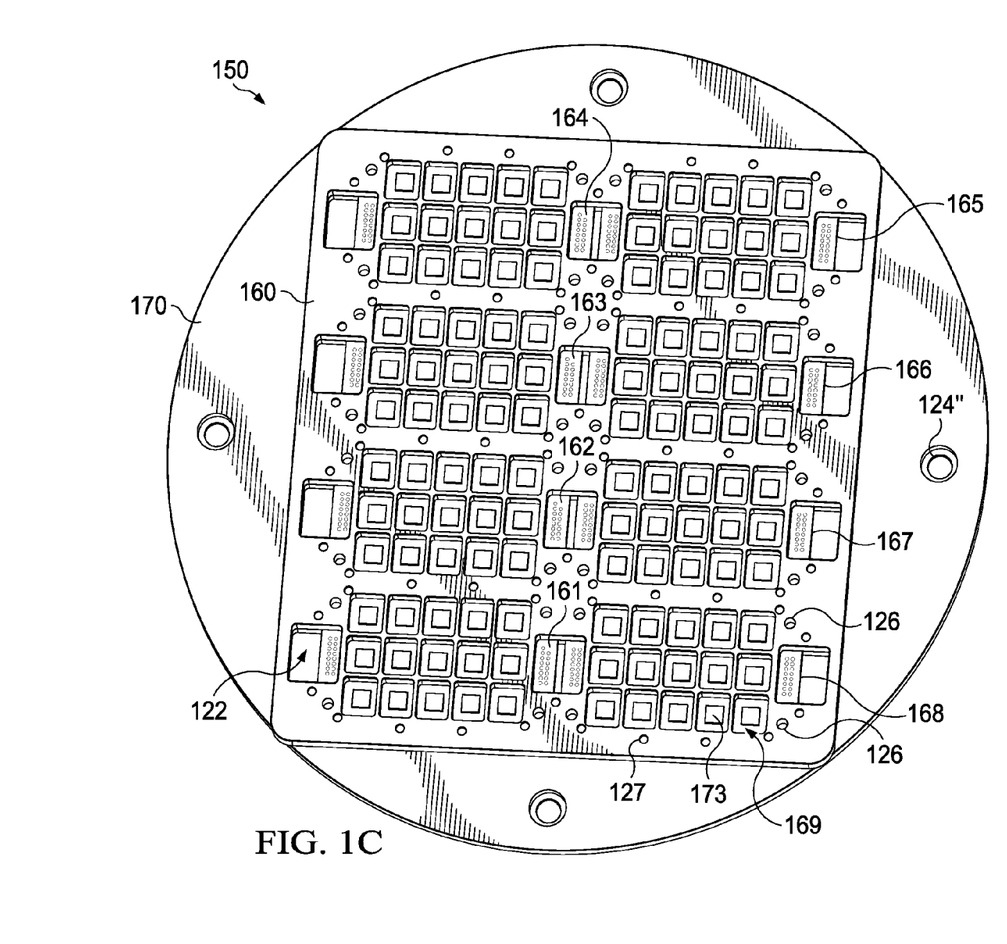
FIG. 1C is a depiction of a second example fixture with eight (8) test PCBAs being held between a top plate and a bottom plate, according to an example embodiment.

FIG. 1C is a depiction of a second example fixture 150 with eight (8) test PCBAs 161-168 being held between a top plate 160 and a bottom plate 170, according to an example embodiment. The table mounting aperture is shown as 124". Fixture 150 divides each test PCBA into 15 locations each with 15 inner top apertures 169 having a semiconductor device 173 within shown for each test PCBA 161-168, with 9 semiconductor devices 173 of which vibration movement is theoretically identical to each other (see FIG. 4B). This means for a single test PCBA there are 9 of the same semiconductor device that are subjected to a theoretically identical stress condition, which means the joint integrity data associated with all 9 semiconductor devices can be plotted on a Weibull plot (or Weibull distribution) that is a continuous probability distribution, which also means with only 4 test PCBAs provide 36 statistically valuable reliability data points. In comparison, fixture 100 shown in FIG. 1A provides a maximum number of semiconductor devices that have same symmetry of 4 (see FIG. 4A); which means 9 boards are needed for 36 reliability data points for a given device. Although the semiconductor devices 173 shown in FIGS. 1A and 1C (and FIG. 3 described below) are all the same device represented by the same device area shown, disclosed fixtures can be used with two or more different semiconductor devices. However, as noted above, having a plurality of the same semiconductor device has the advantage of more easily meeting a requirement for sample size in the test, for example a sample size requirement of 15, or 30, or 45 semiconductor devices.

Disclosed fixtures such as fixture 150 recognize vibration test stress scales up with board size (area). If for example the application for which vibration test is being performed is for an automobile back-up camera, then typically its PCB is small in size, for example 1 inch×1 inch. If the same package and joint to the PCB is vibration tested on a JEDEC compliant board which is generally significantly larger in area, it may fail, giving a false positive result. Disclosed fixtures allow emulating smaller (e.g. 1 inch×1 inch) boards because its inner apertures are sized accordingly to the size of the application board for the end product.

Figure 1D:
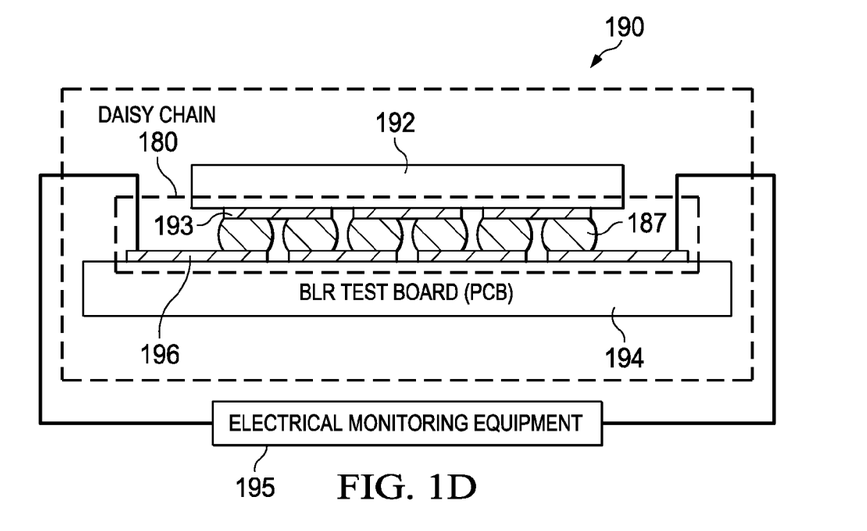
FIG. 1D depicts a daisy chain test structure including solder balls formed between metal pads on a packaged semiconductor device shown as a BGA package and metal pads on a PCB with electrical monitoring equipment (an event detector or data logger) connected across the daisy chain test structure.

FIG. 1D is a cross sectional depiction of a portion of a PCBA 190 showing a daisy chain test structure 180 including solder balls 187 formed between a packaged semiconductor device shown as a BGA package 192 and a PCB shown as a BLR test board 194 with electrical (resistance) monitoring equipment 195 (an event detector or data logger) connected across the daisy chain test structure 180. The BLR test board 194 includes metal pads 196 and the BGA package 192 includes metal pads 193 for daisy chain test structure 180 to implement a daisy chain resistor with the solder balls 187 joints in between which provide the electrical coupling between the respective metal pads 196, 193.

Vibration testing can be performed with in-situ resistance monitoring provided by electrical monitoring equipment 195, by measuring the resistance of the daisy chain test structure 180. Once the resistance value is higher than a certain predetermined threshold resistance for a certain predetermined duration, the test will generally be considered as failure. As noted above, the apertures 122 are for access to probe pads are used for solder connection to the electrical monitoring equipment 195. For the fixture shown in FIG. 1C, there will be 16 wires (15 inputs+1 common GND) connected to each PCB, with 128 wires total on one fixture with 8 PCBAs.

Figure 2:
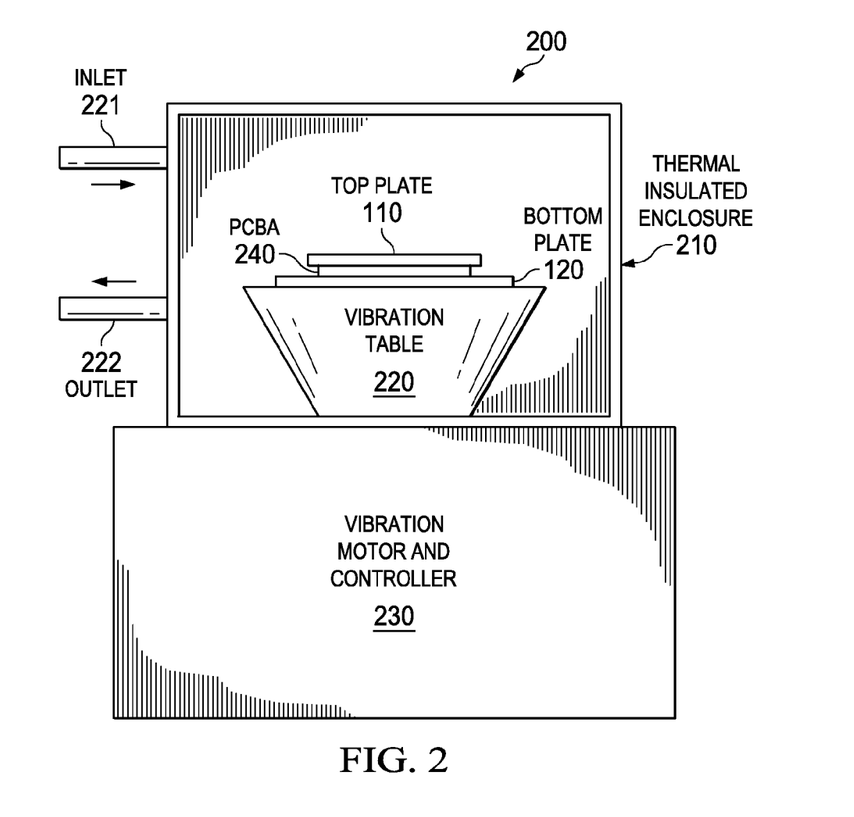
FIG. 2 is an example test system for vibration or mechanical shock and temperature testing at least one test PCBA, according to an example embodiment.

FIG. 2 is an example test system 200 for vibration or mechanical shock and temperature testing at least one test PCBA 240, according to an example embodiment. System 200 includes a thermally insulated enclosure 210 having a vibration table 220 therein, an inlet 221 for flowing a gas into the enclosure 210 and an outlet 222 for flowing the gas out from the enclosure 210. System 200 also includes a vibration motor and controller 230 mechanically coupled to the vibration table 220 for vibrating the vibration table 220. Resistance monitoring equipment and wiring to the test PCBA 240 for resistance monitoring are not shown in FIG. 2, but can be seen in FIG. 1D described above.

System 200 implements temperature cycling simultaneously with vibration or mechanical shock. Sample PCBAs with the fixture and vibration table are enclosed in the enclosure 210 where hot and cold air will be purged into. Imposing temp cycling simultaneously with vibration simulates the application in applications such as automotive applications where the temperature may stray from the typical room temperature range of around 20° C. to 25° C.

Figure 3:
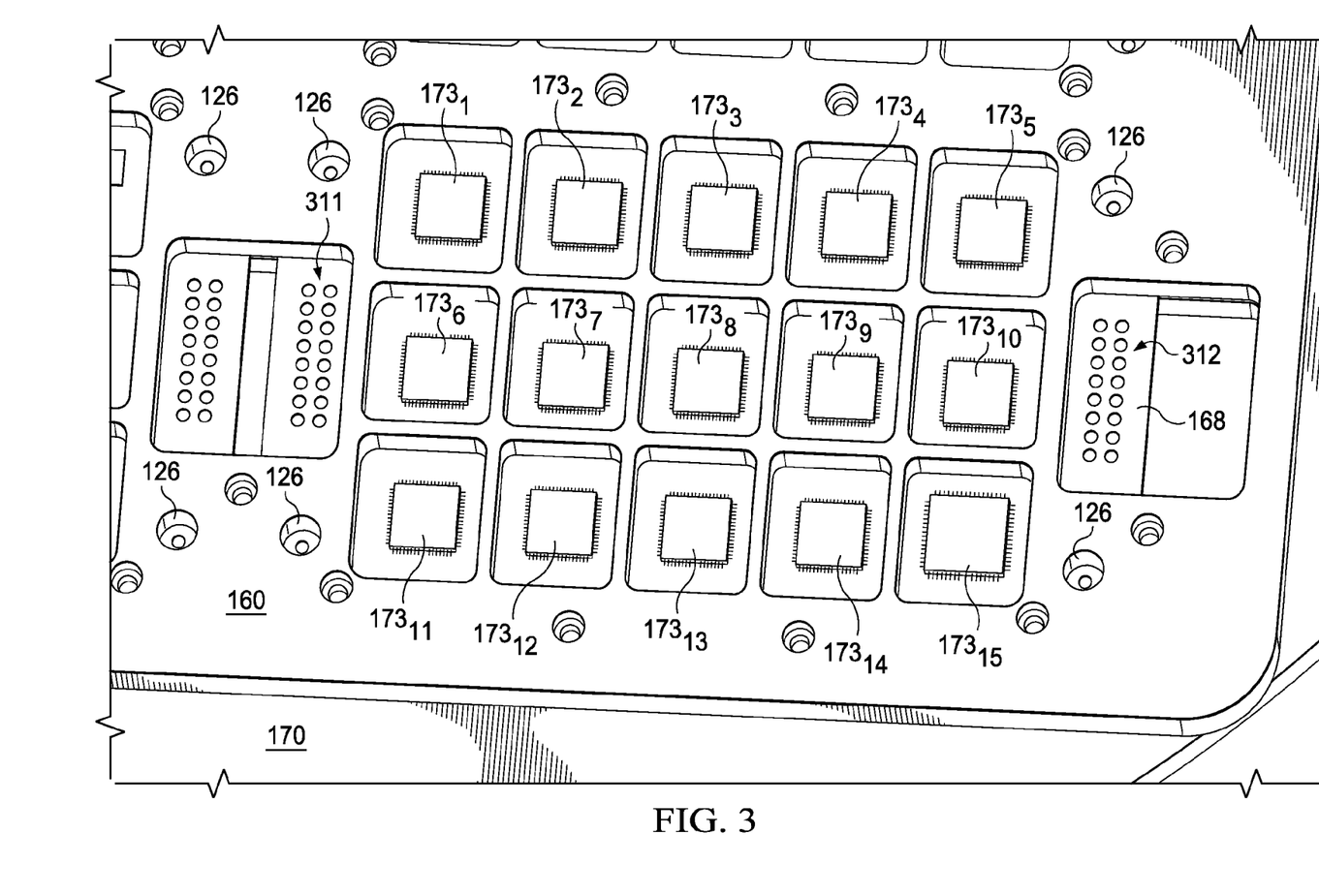
FIG. 3 is a close-up view of the second example fixture in FIG. 1C showing various features.

FIG. 3 is a close-up view of the second example fixture shown in FIG. 1C showing various features. Fifteen (15) of a given semiconductor device 173 can be seen mounted to the PCBA 168 shown numbered 173$_1$ to 173$_{15}$. Connection holes 311 on PCBA 168 are shown for allowing wires from electrical (resistance) monitoring equipment to contact semiconductor devices on the back side of the PCBA 168 as well as connection holes 312 for allowing wires from electrical (resistance) monitoring equipment to contact semiconductor devices on the front side of the PCBA 168 to satisfy JEDEC since JEDEC JESD22-B111 standard boards are 2-sided. The 16 connection holes 311 and 312 provide 1 common ground and 1 resistance monitoring channel per device for each of the 15 semiconductor devices. There are traces on the PCB (not shown) providing an electrical connection from the connection holes 311 and 312 to the respective semiconductor devices. These traces can be on the surface layer or on an inner layer of the PCBA 168.

Figure 4A:
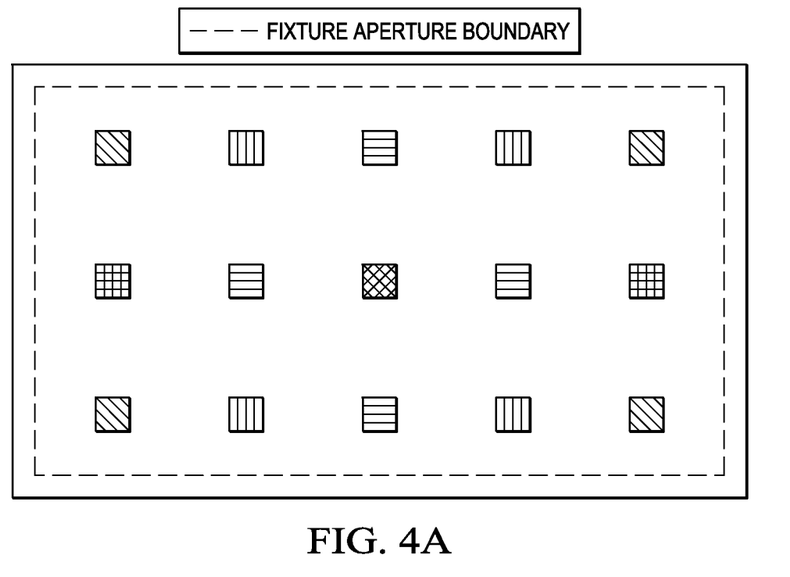
FIG. 4A is a depiction showing groups of semiconductor devices by symmetry for the example first fixture.

FIG. 4A is a depiction including a fixture aperture boundary shown corresponding to the outer edge of the inner top and bottom aperture 118, 118' showing groups of semiconductor devices by symmetry for the example first fixture shown in FIGS. 1A and 1B. For the first fixture, the maximum number of semiconductor devices that are subjected to a theoretically identical stress condition by virtue of the symmetry provided by the fixture is 4; that means 9 boards would be used to provide 36 data points.

Figure 4B:
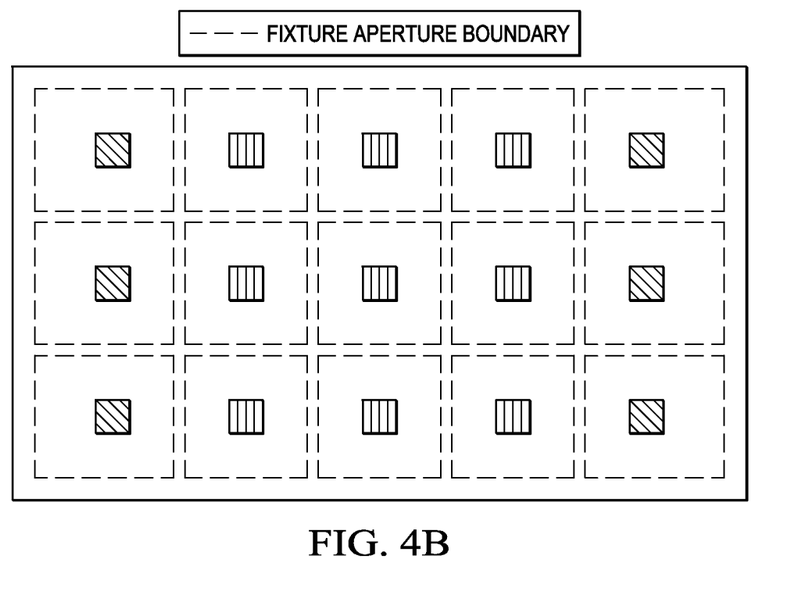
FIG. 4B is a depiction showing groups of semiconductor devices by symmetry for the example second fixture.

FIG. 4B is a depiction including a fixture aperture boundary shown corresponding to the outer edge of the inner top apertures 169 shown in FIG. 1C showing groups of semiconductor devices by symmetry for the example second fixture shown in FIG. 1C. The second fixture divides each test PCBA into 15 locations, in 9 of which the vibration movement is theoretically identical to each other. This means on one test PCBA there are 9 semiconductor devices that are subjected to theoretically identical stress conditions by virtue of the symmetry provided by the fixture, which means data from these 9 semiconductor devices can be plotted in a Weibull plot, which also means with only 4 PCBAs 36 statistically valuable data points can be provided.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:

1. A fixture for securing a plurality of test printed circuit board assemblies (PCBAs) each PCBA including a printed circuit board (PCB) having semiconductor devices mounted thereon during vibration or mechanical shock testing, comprising:
    a top plate including top features including a continuous top outer ring, at least one inner top aperture within said top outer ring, and a plurality of outer top apertures positioned beyond said top outer ring including a top probe access aperture, and a threaded aperture, and
    a bottom plate including bottom features including a continuous bottom outer ring, at least one inner bottom aperture, and a plurality of outer bottom apertures including a bottom probe access aperture and table mounting aperture,
    wherein said threaded aperture accepts a fastener that clamps said top plate to said bottom plate for said top and said bottom outer rings to secure a full periphery of said PCBAs between said top plate and said bottom plate.

2. The fixture of claim 1, wherein said top outer ring and inner top aperture match said bottom outer ring and inner bottom aperture in both size and position upon alignment to one another.

3. The fixture of claim 1, wherein said at least one inner top aperture includes a plurality of inner top apertures.

4. The fixture of claim 3, wherein said plurality of inner top apertures include two (2) or more top apertures which due to symmetry provide vibration movement theoretically identical to one another.

5. A test system for vibration or mechanical shock testing a plurality of test printed circuit board assemblies (PCBAs) each PCBA including a printed circuit board (PCB) having semiconductor devices mounted thereon, comprising:
    an enclosure having a vibration table therein and an inlet for flowing a gas into said enclosure and an outlet for flowing said gas out from said enclosure;
    a vibration motor and controller mechanically coupled to said vibration table for vibrating or applying shock to said vibration table;
    a fixture securing said plurality of test PCBAs, said fixture comprising:
        a top plate including top features including a continuous top outer ring, at least one inner top aperture within said top outer ring, and a plurality of outer top apertures positioned beyond said top outer ring including a top probe access aperture, and a threaded aperture, and
        a bottom plate including bottom features including a bottom continuous outer ring, at least one inner bottom aperture, and a plurality of outer bottom apertures including a bottom probe access aperture and table mounting aperture, wherein said threaded aperture accepts a fastener that clamps said top plate to said bottom plate for said top and said bottom outer rings to secure a full periphery of said plurality of test PCBAs between said top plate and said bottom plate, and at least one fastener securing said fixture to said vibration table by said table mounting aperture.

6. The test system of claim 5, wherein said enclosure is a thermally insulated enclosure.

7. The test system of claim 5, wherein said top outer ring and inner top aperture match said bottom outer ring and inner bottom aperture in both size and position upon alignment to one another.

8. The test system of claim 5, wherein said at least one inner top aperture includes a plurality of inner top apertures.

9. The test system of claim 8, wherein said plurality of inner top apertures each include two (2) or more top apertures which due to symmetry provide vibration movement theoretically identical to one another.

10. The test system of claim 5, further comprising a daisy chain test structure including solder balls formed between ones of said plurality of semiconductor devices and said PCB, and further comprising electrical monitoring equipment connected across said daisy chain test structure.

11. A fixture for securing a plurality of test printed circuit board assemblies (PCBAs) each PCBA including a printed circuit board (PCB) having semiconductor devices mounted thereon during vibration or mechanical shock testing, comprising:
 a top plate including top features including a continuous top outer ring, at least one inner top aperture within said top outer ring, and a plurality of outer top apertures positioned beyond said top outer ring including a top probe access aperture, and a threaded aperture, and
 a bottom plate including bottom features including a continuous bottom outer ring, at least one inner bottom aperture, and a plurality of outer bottom apertures including a bottom probe access aperture and table mounting aperture,
 wherein said threaded aperture accepts a fastener that clamps said top plate to said bottom plate for said top and said bottom outer rings to secure a full periphery of said plurality of test PCBAs between said top plate and said bottom plate,
 wherein said at least one inner top aperture includes a plurality of inner top apertures, and
 wherein said top outer ring and inner top aperture match said bottom outer ring and inner bottom aperture in both size and position upon alignment to one another.

12. The fixture of claim 11, wherein said plurality of inner top apertures include two (2) or more top apertures which due to symmetry provide vibration movement theoretically identical to one another.

* * * * *